US 8,606,119 B2

(12) United States Patent
DeAndrea

(10) Patent No.: US 8,606,119 B2
(45) Date of Patent: Dec. 10, 2013

(54) OPTICAL CHANNEL MONITOR

(75) Inventor: John J. DeAndrea, New Hope, PA (US)

(73) Assignee: Finisar Corporation, Sunnyvale, CA (US)

( * ) Notice: Subject to any disclaimer, the term of this patent is extended or adjusted under 35 U.S.C. 154(b) by 448 days.

(21) Appl. No.: 12/870,211

(22) Filed: Aug. 27, 2010

(65) Prior Publication Data

US 2012/0051737 A1   Mar. 1, 2012

(51) Int. Cl.
*H04B 10/00* (2013.01)
*H04B 10/69* (2013.01)

(52) U.S. Cl.
CPC .................... *H04B 10/695* (2013.01)
USPC ............................ 398/208; 398/209; 398/210

(58) Field of Classification Search
USPC .............................................. 398/208–210
See application file for complete search history.

(56) References Cited

U.S. PATENT DOCUMENTS

| | | | | |
|---|---|---|---|---|
| 5,543,953 | A * | 8/1996 | Sivarajan et al. | 398/202 |
| 7,123,845 | B2 * | 10/2006 | Matsuyama | 398/208 |
| 7,627,253 | B1 * | 12/2009 | Ng | 398/161 |
| 2006/0280397 | A1 * | 12/2006 | Matsumoto et al. | 385/5 |

* cited by examiner

*Primary Examiner* — Danny Leung
(74) *Attorney, Agent, or Firm* — Maschoff Brennan

(57) ABSTRACT

In one example, an optical channel monitor includes a tunable filter, a deinterleaver, first and second optical receivers, and a control module. The tunable filter is configured to receive an optical signal having a plurality of channels spaced at a nominal channel spacing. The deinterleaver has an input with an input channel spacing $F_i$, an even output, and an odd output, the input being connected to an output of the tunable filter. The nominal channel spacing is between about one and two times the input channel spacing $F_i$. A −20 dB bandwidth of the tunable filter is between about two and four times the input channel spacing $F_i$. The first and second optical receivers are coupled to the deinterleaver even and odd outputs, respectively. The control module is coupled to the tunable filter and is configured to tune the tunable filter to a desired center frequency.

20 Claims, 8 Drawing Sheets

OPTICAL CHANNEL MONITOR

BACKGROUND

1. Field of the Invention

Some embodiments relate generally to monitoring optical channel power in optical networks. More particularly, example embodiments relate to an optical channel monitor for monitoring optical channel power.

2. Related Technology

Computing and networking technology have transformed our world. As the amount of information communicated over networks has increased, high speed transmission has become ever more critical. Many high speed data transmission networks rely on optoelectronic devices for facilitating transmission and reception of digital data embodied in the form of optical signals over optical fibers. Optical networks are thus found in a wide variety of high speed applications ranging from modest Local Area Networks (LANs) to backbones that define a large portion of the infrastructure of the Internet.

Some optical networks implement wavelength division multiplexing ("WDM") to increase network bandwidth. In WDM optical networks, multiple optical channels occupying distinct wavelengths/frequencies are multiplexed into a single optical signal for transmission across a single optical fiber.

Error rates in long-haul WDM optical networks depend on, among other things, per channel optical power and optical signal to noise ratio ("OSNR"). In long haul WDM optical networks, optical amplification is typically used every 80 km and each optical amplifier repeater plus the cable between the amplifiers degrades the OSNR as well as produces power ripple across the optical band for the transmission channels. As such, WDM optical networks often implement systems that perform optical channel power monitoring and/or optical channel power correction to ensure flat channel powers and low error rates.

Optical channels in some WDM optical networks are spaced at 100 gigahertz ("GHz") intervals, while optical channels in other WDM optical networks are spaced at 50 GHz intervals, 25 GHz intervals, or other intervals. The higher the channel density, e.g., the smaller the channel spacing, the more difficult it is to accurately measure optical power per channel. Accuracy in measuring optical power per channel also decreases as power disparity among adjacent channels increases.

Some conventional systems for measuring optical power per channel implement tunable filters with non-ideal filter shapes such that bleed-through from adjacent channels contributes significantly to the measured optical power and reduces its accuracy. Other conventional systems for measuring optical power per channel implement arrayed waveguide gratings ("AWGs") that require numerous photodiodes to measure the optical power of all optical channels and are thus cost-prohibitive in many cases.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some embodiments relate to an optical channel monitor for monitoring optical channel power in optical networks.

One example embodiment includes an optical channel monitor including a tunable filter, a deinterleaver, first and second optical receivers, and a control module. The tunable filter is configured to receive an optical signal having a plurality of channels spaced at a nominal channel spacing, the tunable filter having a −20 decibel ("dB") bandwidth. The deinterleaver has an input with an input channel spacing $F_i$, an even output, and an odd output, the input being connected to an output of the tunable filter. The nominal channel spacing is between about one and two times the input channel spacing $F_i$. The tunable filter −20 dB bandwidth is between about two and four times the input channel spacing $F_i$. The first and second optical receivers are coupled to the even and odd outputs, respectively, of the deinterleaver. The control module is coupled to the tunable filter and is configured to tune the tunable filter to a desired center frequency.

Another example embodiment includes an optical channel monitor including means for filtering an optical signal having a plurality of channels spaced at a nominal channel spacing. The optical channel monitor also includes means for separating the optical signal into one or more odd channels and one or more even channels. The nominal channel spacing is between about one and two times an input channel spacing $F_i$ of the means for separating. A −20 dB bandwidth of the means for filtering is between about two and four times the input channel spacing $F_i$. The optical channel monitor also includes means for measuring optical power of passband signals generated by directing the optical signal through both the means for filtering and the means for separating. The optical channel monitor further includes means for scanning the means for filtering across a plurality of center frequencies corresponding to the plurality of channels of the optical signal.

Yet another example embodiment includes a method of monitoring a plurality of optical channels. The method includes receiving, at a tunable filter coupled to a deinterleaver, an optical signal having a plurality of optical channels at a nominal channel spacing. The tunable filter has a −20 dB bandwidth that is between about two and four times an input channel spacing $F_i$ of the deinterleaver. The nominal channel spacing is substantially equal to the input channel spacing $F_i$. A first passband signal derived from the optical signal and centered about a particular center frequency corresponding to a particular optical channel is transmitted through the tunable filter. The first passband signal primarily includes contributions from the particular optical channel and: one or more first optical channels and/or one or more second optical channels. The first optical channels are offset from the particular optical channel by a first frequency offset substantially equal to the input channel spacing $F_i$. The second optical channels are offset from the particular optical channel by a second frequency offset substantially equal to two times the input channel spacing $F_i$. The first passband signal is received at an input of the deinterleaver, which also includes an odd output and an even output. A second passband signal derived from the first passband signal is transmitted through the deinterleaver. The second passband signal is centered about the particular center frequency. An attenuation of the one or more first optical channels in the second passband signal by the tunable filter and deinterleaver is at least a first predetermined amount. An attenuation of the one or more second optical channels in the second passband signal by the tunable filter and deinterleaver is at least a second predetermined amount.

These and other aspects of example embodiments will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

I. Example Optical Channel Monitor

Figure 1:
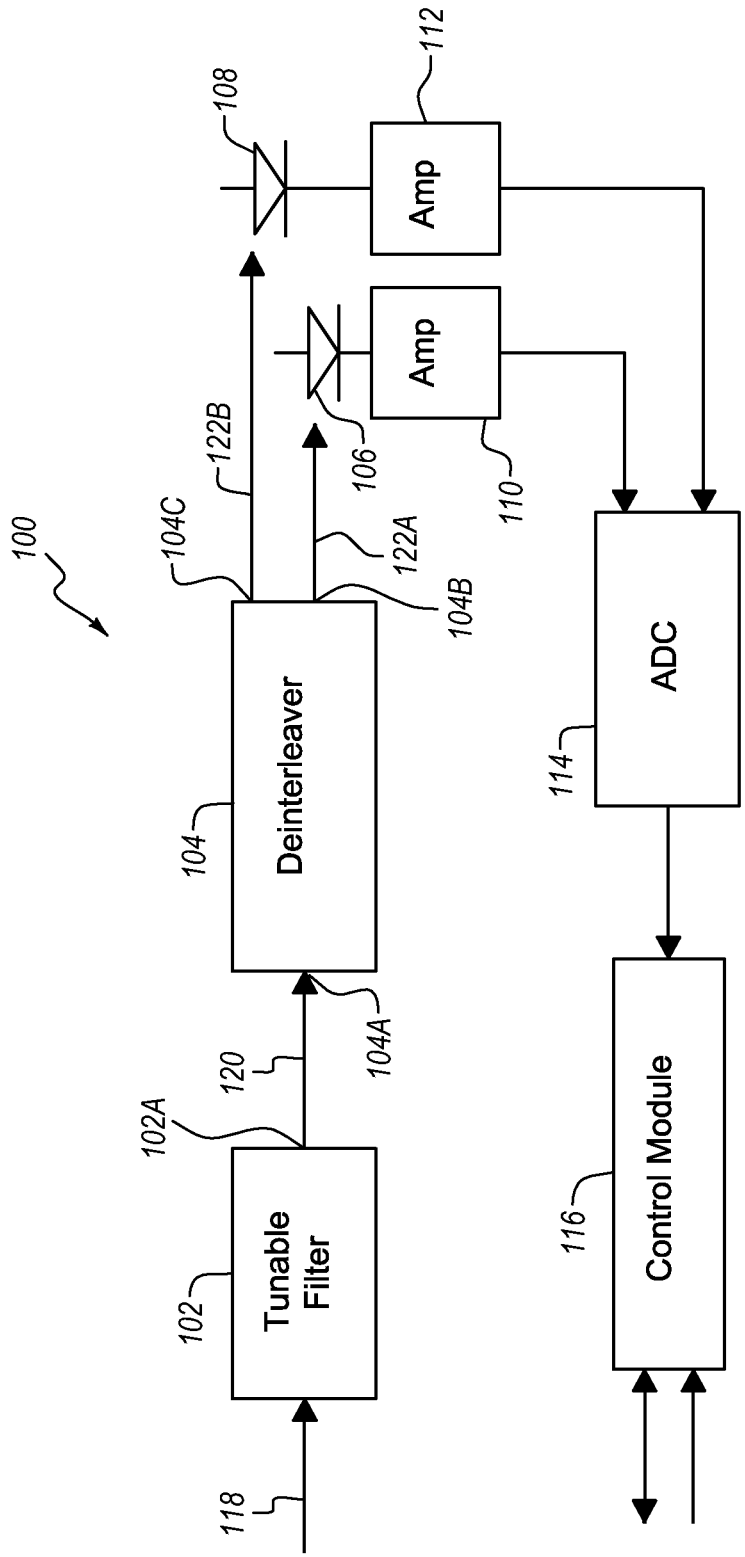
FIG. 1 is a block diagram of an example optical channel monitor including a tunable filter and a deinterleaver according to some embodiments.

Referring to FIG. 1, a first example optical channel monitor 100 according to some embodiments is disclosed. In the example of FIG. 1, the optical channel monitor 100 includes a tunable filter 102, a deinterleaver 104 and first and second optical receivers 106, 108. Although not required in all embodiments, the optical channel monitor 100 further includes first and second post amplifiers 110, 112, an analog-to-digital converter ("ADC") 114, and a control module 116.

A. Tunable Filter

The tunable filter 102 is configured to receive an optical signal 118 having a plurality of optical channels spaced at a first channel spacing. For instance, the optical signal 118 in some embodiments is a dense wavelength division multiplexing ("DWDM") signal having optical channels nominally spaced at 50 gigahertz ("GHz") on the C-Band, e.g., 191 terahertz ("THz")-196 THz, of the ITU Grid. In other embodiments, the optical channels are spaced at less than 50 GHz, e.g., at 25 GHz or 12.5 GHz, or more than 50 GHz, e.g., at 100 GHz or 200 GHz. Alternately or additionally, the optical channels are in some signal band other than the C-Band, such as the L-Band (186-191 THz) or S-Band (196-201 THz) of the ITU Grid.

The tunable filter 102 is further configured to be tuned to substantially any frequency within a tuning frequency range of the tunable filter 102 so as to transmit through the tunable filter 102 a first passband signal 120, transmitted from an output 102A of the tunable filter 102. As will be explained in greater detail below, the frequencies to which the tunable filter 102 is tuned during operation generally correspond to nominal center frequencies of the optical channels of optical signal 118. Accordingly, the first passband signal 120 in some embodiments is centered about a particular center frequency corresponding to a particular optical channel within the optical signal 118. Alternately or additionally, the first passband signal 120 primarily includes contributions from the particular optical channel and one or more adjacent optical channels. Thus, the tunable filter 102 is one example of a structural implementation of a means for filtering an optical signal having a plurality of channels.

In some embodiments, the tunable filter 102 is a 2-port tunable filter such as the 2-port micro-electro-mechanical system ("MEMS") Tunable Filter marketed by DiCon Fiberoptics, Inc.

Figure 2:
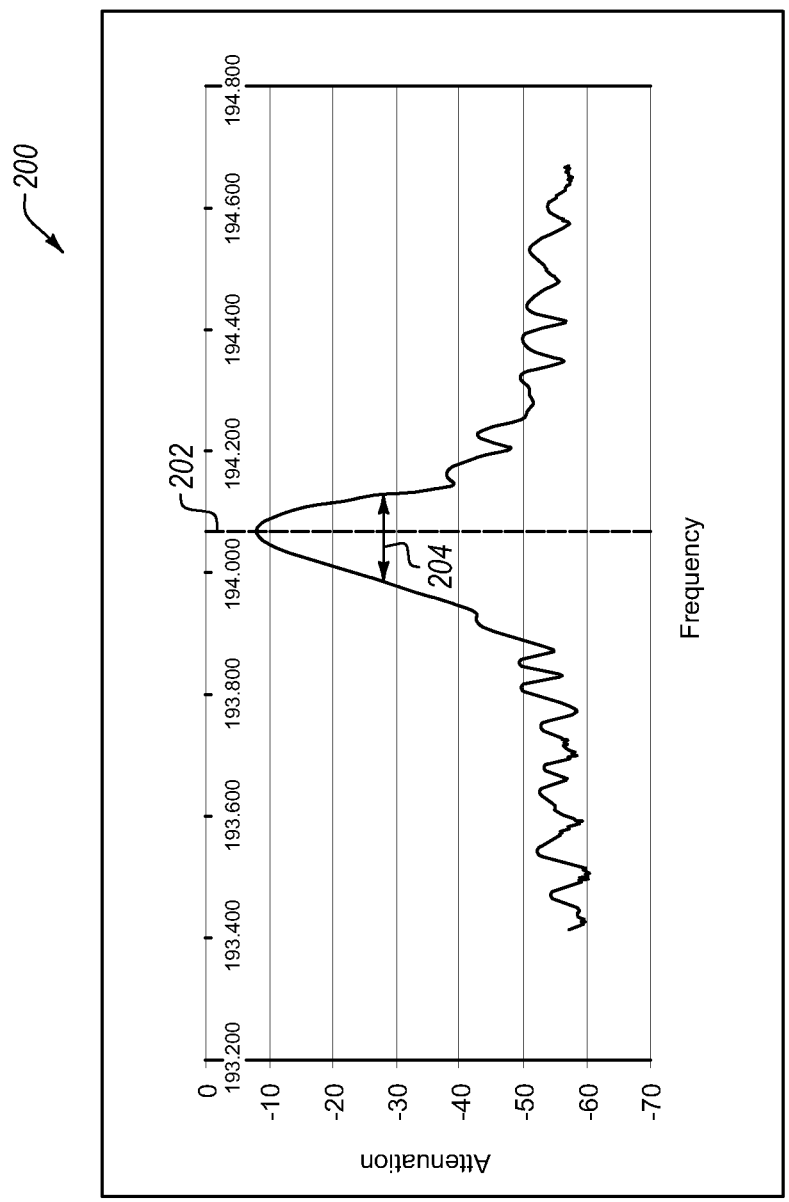
FIG. 2 illustrates an example filter response for the tunable filter of FIG. 1.

Referring to FIG. 2, an example filter response 200 of the tunable filter 102 is disclosed. In the example of FIG. 2, the filter response 200 is centered about a center frequency 202 to which the tunable filter 102 is tuned. As shown, the center frequency 202 is approximately 194.07 THz. Further, the −20 dB bandwidth 204 of the tunable filter 102 is about 142 GHz in the illustrated embodiment. Alternately or additionally, the −20 dB bandwidth 204 of the tunable filter 102 is approximately 100 GHz. More generally, the −20 dB bandwidth of the tunable filter 102 is between about two and four times an input channel spacing $F_i$ of the deinterleaver 104.

B. Deinterleaver

The deinterleaver 104 follows the tunable filter 102 and includes an input 104A, an even output 104B and an odd output 104C. Generally, the deinterleaver is configured to separate an optical signal, such as optical signal 118 having multiple optical channels, into one or more odd channels and one or more even channels. As such, the input channel spacing $F_i$ of the deinterleaver 104 is typically half of the output channel spacing $F_o$ on the odd or even outputs 104C, 104B. For instance, when the input channel spacing $F_i$ of deinterleaver 104 is 50 GHz, the output channel spacing $F_o$ on both the even and odd outputs 104B, 104C is about 100 GHz. Further the output channel spacing $F_o$ on the even output 104B in this example is offset by about 50 GHz from the output channel spacing $F_o$ on the odd output 104C. The deinterleaver 104 is one example of a structural implementation of a means for separating an optical signal into one or more odd channels and one or more even channels.

According to some embodiments, the nominal channel spacing of the optical signal 118 is between about one and two times the input channel spacing $F_i$ of the deinterleaver 104. For example, if the input channel spacing $F_i$ of the deinterleaver 104 is 50 GHz, the first channel spacing of the optical signal 118 may be between about 50 GHz and 100 GHz.

Alternately or additionally, and as already indicated above, the −20 dB bandwidth of the tunable filter 102 is between about two and four times the input channel spacing $F_i$ of the deinterleaver 104. For instance, if the input channel spacing $F_i$ of the deinterleaver 104 is 50 GHz, the −20 dB bandwidth of the tunable filter 102 may be between about 100 GHz and 200 GHz.

Accordingly, some embodiments disclosed herein permit a relatively low cost tunable filter 102 having a −20 dB bandwidth of $2*F_i$ to be extended to measure optical channels nominally spaced at $F_i$ with the aid of a deinterleaver 104 having an input channel spacing of F. For instance, a tunable filter 102 having a −20 dB bandwidth of 100 GHz can be extended, with the aid of a deinterleaver 104 having an input channel spacing of 50 GHz, to measure optical channels nominally spaced at 50 GHz. It will be appreciated that such an embodiment may be relatively less expensive than using a 50 GHz tunable filter to measure optical channels nominally spaced at 50 GHz.

Figure 3:
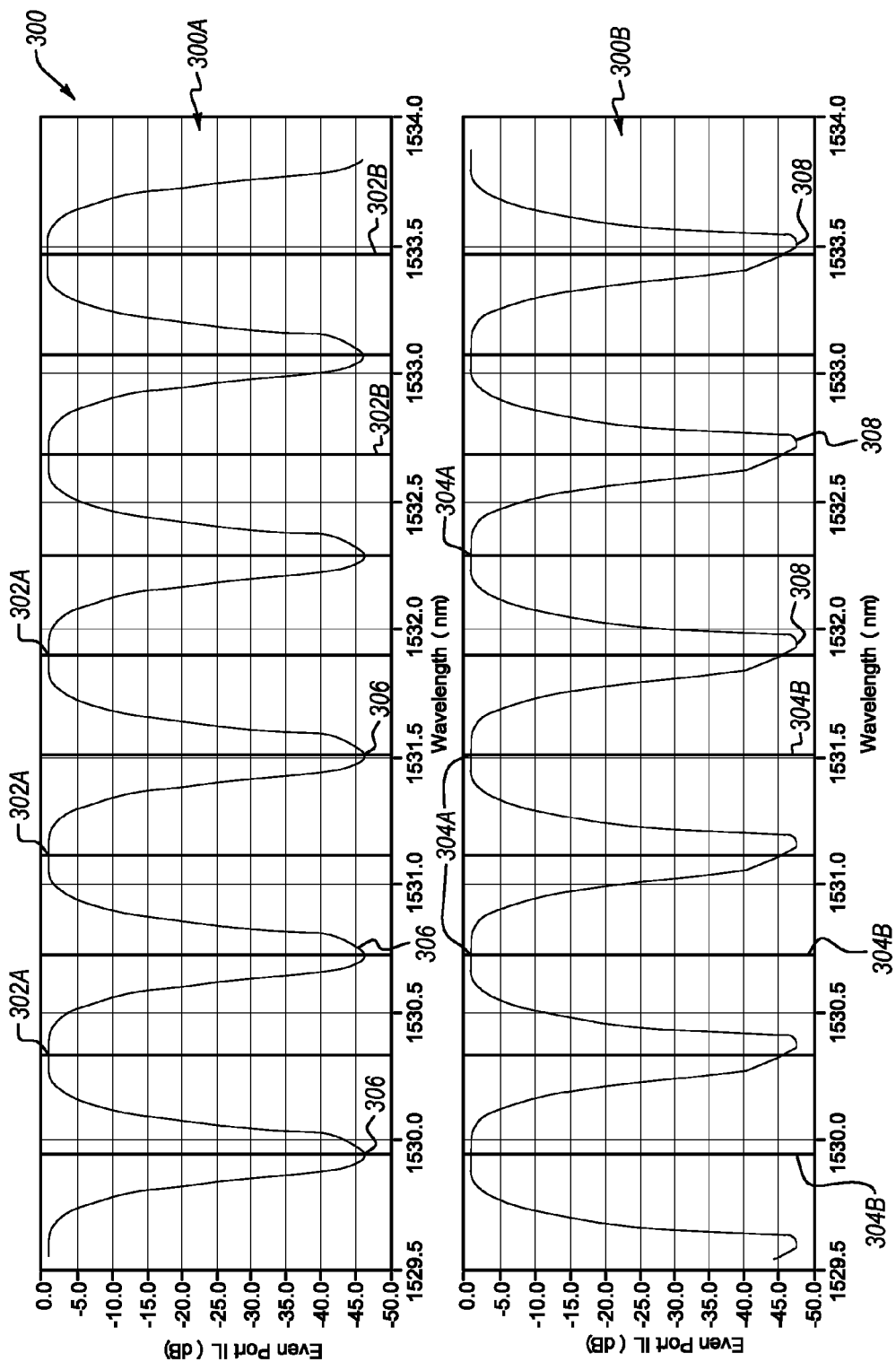
FIG. 3 illustrates an example filter response including an even transmission function and an odd transmission function for the deinterleaver of FIG. 1.

Referring to FIG. 3, an example filter response 300 of the deinterleaver 104 is disclosed. In the illustrated embodiment, the x-axis is marked in units of nanometers ("nm") corresponding to wavelength. For the illustrated wavelength range, although not constant across the wavelength range, the conversion from wavelength to frequency is approximately 0.08 nm=100 GHz.

In the example of FIG. 3, the filter response 300 includes an even transmission function 300A corresponding to the even output 104B and an odd transmission function 300B corresponding to the odd output 104C. The even and odd transmission functions 300A, 300B have periodic transmission maxima 302A, 304A centered on corresponding even and odd channels 302B, 304B of the optical signal 118. For instance, in the example of FIG. 3, the even transmission function 300A of filter response 300 includes periodic transmission maxima 302A centered on the following even channels 302B: 1529.55 nm, 1530.33 nm, 1531.12 nm, 1531.90 nm, 1532.68 nm and 1533.47 nm. Analogously, in the example of FIG. 3, the odd transmission function 300B of filter response 300 includes periodic transmission maxima 304A centered on the following odd channels 304B: 1529.94 nm, 1530.72 nm, 1531.51 nm, 1532.29 nm and 1533.07 nm.

The even and odd transmission functions 300A, 300B of filter response 300 further include periodic transmission minima 306, 308 centered on corresponding odd and even channels 304B, 302B of the optical signal 118. For instance, in the example of FIG. 3, the even transmission function 300A includes periodic transmission minima 306 centered on odd channels 304B. Analogously, the odd transmission function 300B includes periodic transmission minima 308 centered on even channels 302B.

Further, it can be determined from FIG. 3 that the transmission maxima 304A of the odd transmission function 300B are offset by a wavelength equivalent of 50 GHz from the nearest transmission maxima 302A of the even transmission function 300A.

Thus, on its even output 104B, the deinterleaver 104 is configured to substantially transmit even channels 302B and to substantially reject (e.g., attenuate) odd channels 304B, as indicated by the even transmission function 300A of filter response 300. Analogously, on its odd output 104C, the deinterleaver 104 is configured to substantially transmit odd channels 304B and to substantially reject even channels 302B, as indicated by the odd transmission function 300B of filter response 300.

In the discussion that follows, reference is made to "adjacent" channels. As used herein, an adjacent channel is a channel that is adjacent to a given channel. For instance, in the example of FIG. 3, the 1531.90 nm even channel 302B has two adjacent channels, specifically, the 1531.51 nm and 1532.29 nm odd channels 304B.

The term "odd" or "even" can be used in combination with the term "adjacent channel" to specifically refer to an adjacent one of the odd or even channels 304B, 302B. As such, each of the even channels 302B has one or more adjacent even channels 302B and one or more adjacent odd channels 304B, while each of the odd channels 304B analogously has one or more adjacent odd channels 304B and one or more adjacent even channels 302B. It is apparent that the frequency offset between a particular even channel 302B (or odd channel 304B) and an adjacent odd channel 304B (or even channel 302B) is about half the frequency offset between the same particular even channel 302B (or odd channel 304B) and an adjacent even channel 302B (or odd channel 304B) in the example of FIG. 3.

In operation, the deinterleaver 104 receives the first passband signal 120 at its input 104A as depicted in FIG. 1. The deinterleaver 104 is configured to transmit a second passband signal 122A or 122B derived from and centered on the same frequency as the first passband signal 120 through the deinterleaver 104 through either the even output 104B or the odd output 104C. The second passband signal 122A is generated and transmitted through the even output 104B when the first passband signal 120 is centered about an even channel 302B. Or, the second passband signal 122B is generated and transmitted through the odd output 104C when the first passband signal 120 is centered about an odd channel 304B. Accordingly, the second passband signal 122A or 122B is centered about the same frequency as the first passband signal 120.

As previously indicated, in some embodiments, the first passband signal 120 primarily includes contributions from the channel to which the tunable filter 102 is tuned, as well as contributions from one or more adjacent channels. When the tunable filter 102 is tuned to an even channel 302B having an adjacent odd channel 304B on one or both sides, contributions to the first passband signal 120 from the adjacent odd channels 304B will be significant. As such, any power disparity between the even channel 302B and adjacent odd channels 304B would introduce error into power measurements of the even channel 302 based on the first passband signal 120, which error increases as the power disparity increases. Similar problems arise when power measurements are made based on the first passband signal 120 for any odd channel 304B having power disparity with one or more adjacent even channels 302B.

To reduce error in power measurements according to some embodiments, however, power measurements are made on the second passband signal 122A or 122B transmitted through the deinterleaver 104. Because the deinterleaver 104 substantially attenuates the odd channels 304B on the even output 104B, any adjacent odd channels 304B contributing to the first passband signal 120 are substantially attenuated in the second passband signal 122A when the first passband signal 120 is centered on an even channel 302B. Analogously, because the deinterleaver 104 substantially attenuates the even channels 302B on the odd output 104C, any adjacent even channels 302B contributing to the first passband signal 120 are substantially attenuated in the second passband signal 122B when the first passband signal 120 is centered on an odd channel 304B. For instance, in some embodiments, the rejection by the deinterleaver 204 of adjacent odd channels 304B (or even channels 302B) in the second passband signal 122A (or 122B) at the even output 104B (or odd output 104C) is 40 dB or more.

As such, the contributions from the adjacent odd (or even) channels 304B (or 302B) to the second passband signal 122A (or 122B) are substantially attenuated when the second passband signal 122A (or 122B) is centered on an even (or odd) channel 302B (or 304B). Additionally, as explained in greater detail below, contributions from the adjacent even (or odd) channels 302B (or 304B) to the second passband signal 122A (or 122B) centered on an even (or odd) channel 302B (or 304B) are also substantially attenuated. In some embodiments, an attenuation of one or more adjacent even (or odd) channels 302B (or 304B) in the second passband signal 122A (or 122B) centered on an even (or odd) channel 302B (or 304B) is at least a predetermined amount. The predetermined amount is at least 20 dB. Alternately or additionally, the predetermined amount is at least 25 dB.

C. Composite Response

Figure 4:
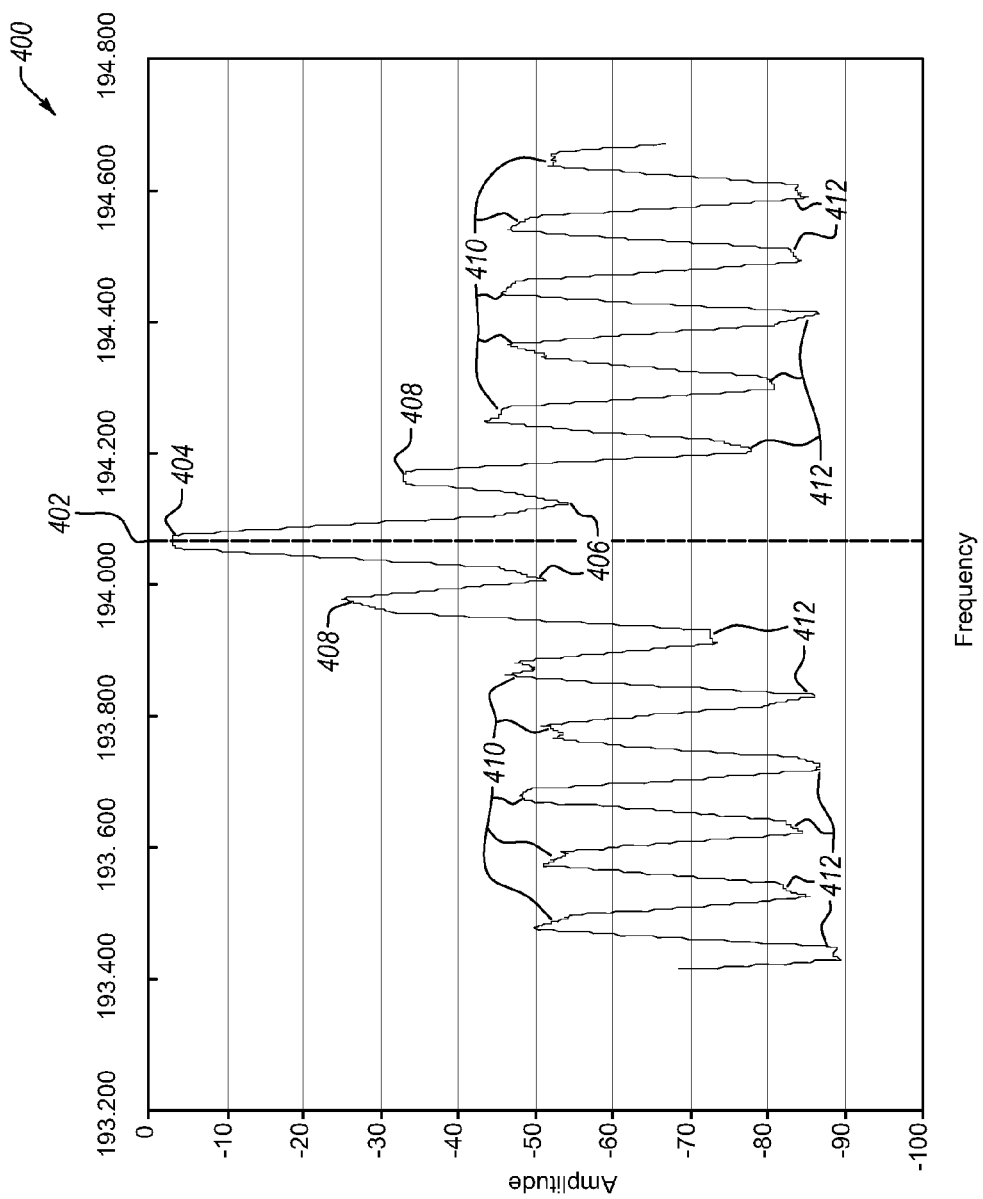
FIG. 4 illustrates an example composite filter response for the optical channel monitor of FIG. 1.

In this regard, FIG. 4 discloses an example composite filter response 400 for the optical channel monitor 100 including the combination of the tunable filter 102 and deinterleaver 104. In the example of FIG. 4, the composite filter response 400 is centered about a frequency 402 to which the tunable filter 102 is tuned. Specifically, the center frequency 402 in FIG. 4 is approximately 194.05 GHz, corresponding to an odd channel of 1544.92 nm. Accordingly, the composite filter response 400 is a composite of the tunable filter 102 filter response 200 centered about 194.05 GHz and the odd transmission function 300B of deinterleaver 104.

Although the composite filter response 400 is centered about 194.05 GHz corresponding to an odd channel, the features of composite filter response 400 discussed below generally apply to the composite filter response for the optical channel monitor 100 centered about any center frequency 402 corresponding to any even or odd channel. As such, when the composite filter response 400 is centered about a center frequency 402 corresponding to an even channel (such a center frequency is hereinafter referred to as an "even center frequency"), the composite filter response 400 in some embodiments is a composite of the tunable filter 102 filter response 200 centered about the even center frequency 402 and the even transmission function 300A of the deintereleaver 104. Analogously, when the composite filter response 400 is centered about a center frequency 402 corresponding to an odd channel (such a center frequency is hereinafter referred to as an "odd center frequency"), the composite filter response 400 in some embodiments is a composite of the tunable filter 102 filter response 200 centered about the odd center frequency 402 and the odd transmission function 300B of the deintereleaver 104.

In the example of FIG. 4, the composite filter response 400 includes a single absolute transmission maximum 404, two adjacent local transmission minima 406 and two adjacent local transmission maxima 408. A center frequency of the absolute transmission maximum 404 is the center frequency 402.

As illustrated, the adjacent local transmission minima 406 are offset from the center frequency 402 by about 50 GHz. More generally, the adjacent local transmission minima 406 are offset from the center frequency 402 by an amount substantially equal to the input channel spacing $F_i$ of the deinterleaver 104.

Additionally, the adjacent local transmission maxima 408 are offset from the center frequency 402 by about 100 GHz. More generally, the adjacent local transmission maxima 408 are offset from the center frequency 402 by an amount substantially equal to twice the input channel spacing $F_i$ of the deinterleaver 104.

The composite filter response 400 further includes outlying local maxima 410 and outlying local minima 412. The outlying local maxima 410 are spaced apart from each other (and from the adjacent local transmission maxima 408) at 100 GHz spacing, or about twice the input channel spacing $F_i$ of the deinterleaver 104. Analogously, the outlying local minima 412 are spaced apart from each other (and from the adjacent local transmission minima 406) at 100 GHz spacing, or about twice the input channel spacing $F_i$ of the deinterleaver 104.

With combined reference to FIGS. 1-4, when the tunable filter 102 is tuned to a particular center frequency 202, the center frequency 402 of the composite filter response 400 is the same as the center frequency 202. When the center frequency 202, 402 corresponds to an odd channel 304B, the absolute transmission maximum 404, adjacent local transmission maxima 408 and outlying local maxima 410 have center frequencies corresponding to the periodic transmission maxima 304A of odd transmission function 300B while the adjacent local minima 406 and outlying local minima 412 have center frequencies corresponding to the periodic transmission minima 308 of odd transmission function 300B. Analogously, when the center frequency 202, 402 corresponds to an even channel 302B, the absolute transmission maximum 404, adjacent local transmission maxima 408 and outlying local maxima 410 have center frequencies corresponding to the periodic transmission maxima 302A of even transmission function 300A while the adjacent local minima 406 and outlying local minima 412 have center frequencies corresponding to the periodic transmission minima 306 of odd transmission function 300B.

Accordingly, the general pattern of alternating maxima 404, 408, 410 and minima 406, 412 in the composite filter response 400 of FIG. 4 is contributed by the deinterleaver 104. Analogously, the greater attenuation of the adjacent local transmission maxima 408 relative to the absolute transmission maximum 404 and of the outlying local maxima 410 relative to the adjacent local transmission maxima 408 is provided by the tunable filter 102.

As already mentioned above, the center frequency 402 corresponds to an odd channel 304B in the example of FIG. 4, which odd channel 304B may be referred to herein as the center odd channel. The adjacent local transmission maxima 408 correspond to adjacent odd channels. According to the embodiment of FIG. 4, the attenuation of the adjacent odd channels is at least a predetermined amount. For instance, the adjacent odd channel having a lower frequency than the center frequency 402 is attenuated about 25 dB, while the adjacent odd channel having a higher frequency than the center frequency 402 is attenuated about 33 dB, as can be seen from the amplitudes of the adjacent local transmission maxima 408 in the composite filter response 400.

More generally, as can be seen from the composite filter response 400 of FIG. 4, the optical channel monitor 100 is configured to attenuate adjacent odd channels at least 20 dB when the tunable filter 102 is tuned to a center odd channel. Analogously, the optical channel monitor 100 is configured to attenuate adjacent even channels at least 20 dB when the tunable filter 102 is tuned to a center even channel.

D. Additional Aspects

Returning to FIG. 1, to perform power measurements, the second passband signal 122A or 122B is received by first or second optical receiver 106, 108. Each of optical receivers 106, 108 is a p-type, intrinsic, n-type ("PIN") photodiode, or other suitable photodetector. Each optical receiver 106, 108, upon receiving second passband signal 122A, 122B, is configured to generate an analog electrical signal representative of an optical power of the second passband signal 122A, 122B, which analog electrical signal is amplified in some embodiments by post amplifier 110 or 112 and then transmitted to ADC 114.

The ADC 114 is configured to convert the amplified analog electrical signals received from post amplifiers 110, 112 to digital signals which are transmitted to the control module 116. Although FIG. 1 depicts a single ADC 114, the optical channel monitor 100 alternately includes two ADCs 114, one each for receiving amplified analog electrical signals from a different one of post amplifiers 110, 112. Alternately, a single ADC 114 with a selector can be employed to selectively receive amplified analog electrical signals from each of post amplifiers 110, 112.

The control module 116 is configured to determine the optical power of the second passband signal 122A or 122B based on the digital signal received from the ADC 114. Alternately or additionally, the control module 116 is connected to the tunable filter 102 and is configured to tune the tunable filter 102 to a particular frequency typically corresponding to a center frequency of one of the optical channels of optical signal 118. In some embodiments, the control module 116 periodically scans the tunable filter 102 across all of the center frequencies of the optical channels so as to measure power for all of the optical channels. Scanning the tunable filter 102 includes tuning the tunable filter 102 to a particular channel for sufficient time to measure optical power of the resulting second passband signal 122A or 122B, tuning the tunable filter 102 to the next channel for sufficient time to measure optical power of the resulting second passband signal 122A or 122B, and so on.

The control module 116 is a processor, microprocessor, controller, microcontroller, or other computing device suitable for controlling operation of the optical channel monitor 100 via execution of software and/or firmware. Although not shown, the control module 116 in some embodiments has access to volatile or non-volatile memory.

The optical receivers 106, 108, post amplifiers 110, 112, ADC 114 and control module 116 represent one example of a means for measuring optical power of the second passband signal 122A, 122B received from the even or odd output 104B, 104C of the deinterleaver 104.

In operation, the control module 116 tunes the tunable filter 102 to a particular frequency corresponding to a center frequency of one of the optical channels of the optical signal 118. The tunable filter 102 receives the optical signal 118 and filters it to generate the first passband signal 120 transmitted from the output 102A of the tunable filter 102 to the input 104A of deinterleaver 104.

When the first passband signal 120 is centered on an even frequency (e.g., a frequency corresponding to an even channel), the deinterleaver 104 substantially rejects any odd channels included in the first passband signal 120 and generates the second passband signal 122A which is provided at the even output 104B to first optical receiver 106. First optical receiver 106 generates an electrical signal indicative of the optical power in the second passband signal 122A, which electrical signal is amplified by amplifier 110, digitized by ADC 114, and sampled by control module 116 to measure the optical power of the second passband signal 122A. Optionally, the control module 116 stores the measured optical power of the second passband signal 122A in a table or other data structure and/or keeps track of the center frequency and/or corresponding even channel associated with the measured optical power.

Alternately, when the first passband signal 120 is centered on an odd frequency (e.g., a frequency corresponding to an odd channel), the deinterleaver 104 substantially rejects any even channels included in the first passband signal 120 and generates the second passband signal 122B which is provided at the odd output 104C to second optical receiver 108. Second optical receiver 108 generates an electrical signal indicative of the optical power in the second passband signal 122B, which electrical signal is amplified by amplifier 112, digitized by ADC 114, and sampled by control module 116 to measure the optical power of the second passband signal 122B. Optionally, the control module 116 stores the measured optical power of the second passband signal 122B in a table or other data structure and/or keeps track of the center frequency and/or corresponding odd channel associated with the measured optical power.

After the optical power of the second passband signal 122A or 122B is measured, in some embodiments, the control module 116 increments the center frequency to which the tunable filter 102 is tuned by an amount equal to the input channel spacing $F_i$ of the deinterleaver 104. The control module 116 maintains the tunable filter 102 at the new center frequency for sufficient time to measure the optical power and optionally store the measured optical power of the resulting second passband signal 122A or 122B. According to some examples, the process of incrementing the center frequency of the tunable filter 102 and measuring optical power of the resulting second passband signal 122A or 122B repeats until some or all of the channels of the optical signal 118 have been measured.

E. Error Correction

In some embodiments, the measured optical power of the second passband signal 122A or 122B is substantially equal to the actual optical power of the channel corresponding to the center frequency of the tunable filter 102. In other embodiments, contributions to the second passband signal 122A or 122B from one or more adjacent channels introduce error in the measured optical power. According to some embodiments, the introduced error varies as a function of power disparity between channels. However, when centered on a given even (or odd) channel, because the optical channel monitor 100 attenuates adjacent odd (or even) channels in the second passband signal 122A (or 122B) by a significant amount, e.g., at least 40 dB in some embodiments, and further attenuates adjacent even (or odd) channels in the second passband signal 122A (or 122B) by a significant amount, e.g., at least 25 dB in some embodiments, the introduced error is relatively small even for relatively large power disparities.

Figure 5A:
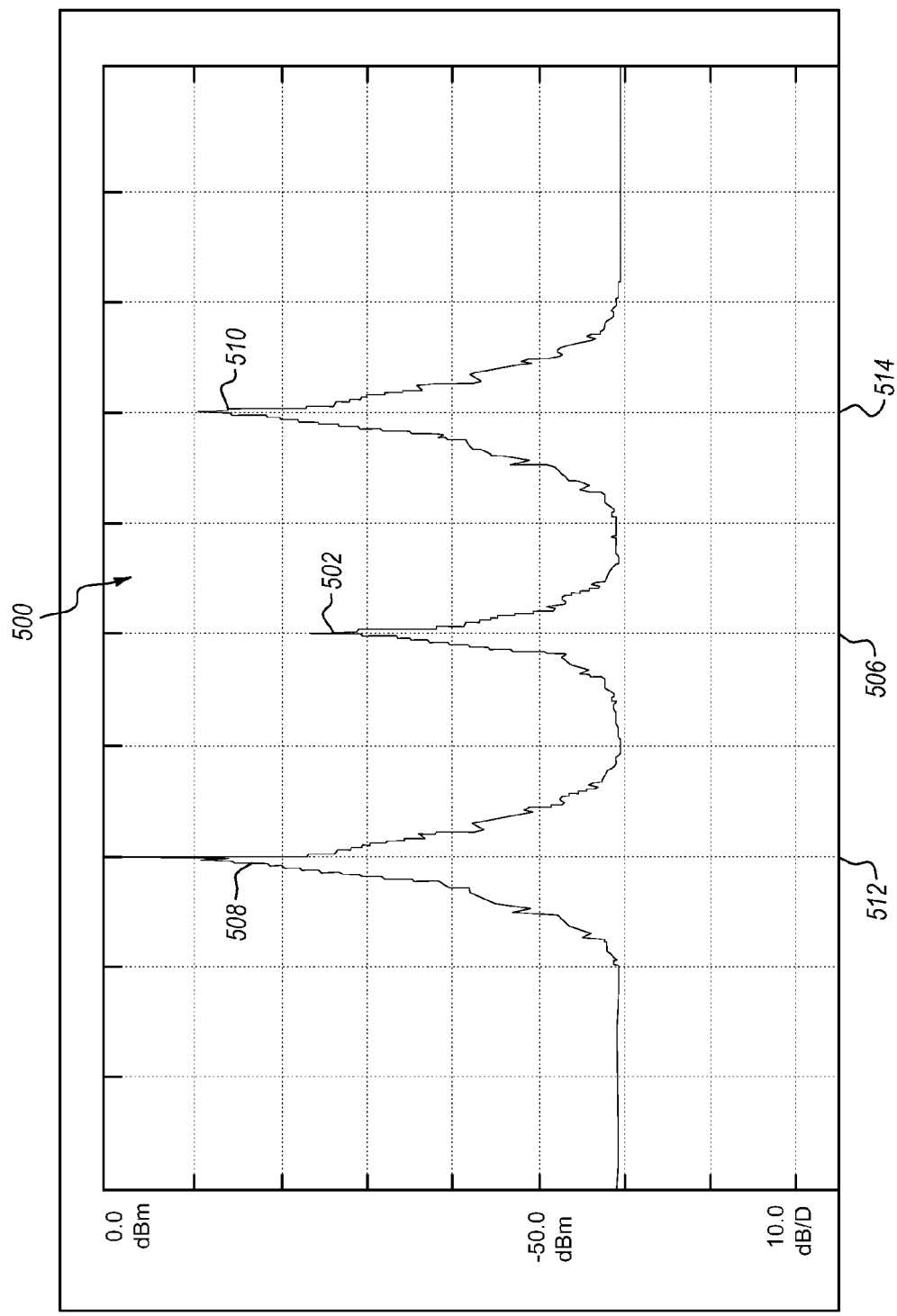
FIG. 5A is an example optical spectrum having a center odd channel and two adjacent odd channels.
Figure 5B:
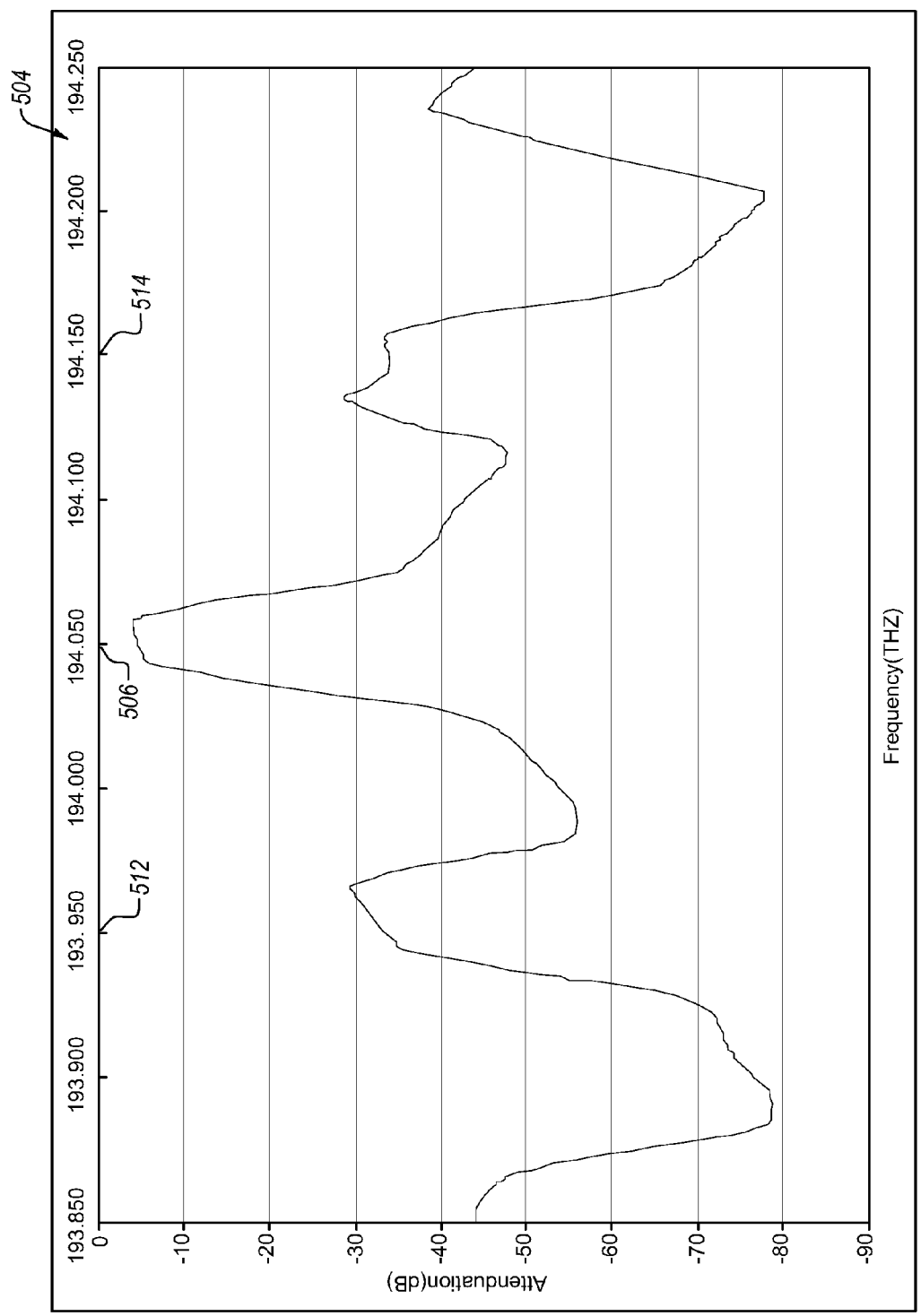
FIG. 5B illustrates an example composite filter response for the optical channel monitor of FIG. 1 centered about the center odd channel of FIG. 5A.

For example, consider FIGS. 5A and 5B which depict, respectively, an example optical spectrum 500 having a center odd channel 502, and a composite filter response 504 for the optical channel monitor 100 with the tunable filter 102 tuned to center frequency 506 corresponding to center odd channel 502. As seen in FIG. 5A, the optical spectrum 500 further includes two adjacent odd channels 508, 510 having 15 dB higher optical power than the center odd channel 502. Specifically, the optical power of the center odd channel 502 is about −25 dBm and the optical power of each adjacent odd channel 508, 510 is about −10 dBm. In some embodiments, the optical spectrum 500 is the optical spectrum for the optical signal 118 at the input of tunable filter 102. Adjacent odd channel 508 is centered about frequency 512 and adjacent odd channel 510 is centered about frequency 514.

Although not shown, the optical spectrum 500 may further include one or more adjacent even channels centered about frequencies halfway between frequencies 506, 512 and 514. In this example, even if the optical spectrum 500 includes such adjacent even channels and the adjacent even channels have optical power that is 15 dB (or more) higher than the optical power of the center odd channel 502, the optical channel monitor 100 attenuates the adjacent even channels by 40 dB or more as already explained above such that any contribution from the adjacent even channels to the second passband signal 122B would be negligible and would not introduce significant error in the power measurement of center odd channel 502.

With continued reference to FIGS. 5A and 5B, the power disparity between the center odd channel 502 and each of adjacent odd channels 508, 510 is 15 dB, which is significant enough that, in some conventional systems for measuring optical power of the center odd channel 502, the power disparity would introduce a significant amount of error in the power measurement for the center odd channel 502.

As best seen in FIG. 5B, however, the optical channel monitor 100 attenuates each of adjacent odd channels 508, 510 by more than 25 dB. For the present example, however, it will be assumed that the optical channel monitor 100 attenuates each of adjacent odd channels 508, 510 by 25 dB. Further, the optical channel monitor 100 attenuates the center odd channel 502 about 5 dB. Accordingly, when the tunable filter 102 of optical channel monitor 100 is tuned to center frequency 506, the contribution to the optical power of the second passband signal 122B from the center odd channel 502 will be about −30 dBm (e.g., −25 dBm actual power +−5 dB attenuation) and the contribution from each of adjacent odd channels 508, 510 will be about −35 dBm (e.g., −10 dBm actual power +−25 dB attenuation), for an aggregate total of −27.87 dBm. As such, the measured optical power for the second passband signal 122B will be about −27.87 dBm.

Whereas the contribution from the center odd channel 502 to the measured optical power of the second passband signal 122B is actually −30 dBm, rather than −27.87 dBm, it can be determined that the contributions from the adjacent odd channels 508, 510 to the measured optical power introduce a relatively insignificant 2.13 dB error, notwithstanding the 15 dB power disparity between the center odd channel 502 and the adjacent odd channels 508, 510.

As another example, consider a power disparity of 10 dB where the power of the center odd channel 502 is −20 dBm, as opposed to −25 dBm, and the power of each adjacent odd channel 508, 510 is still −10 dBm, where the optical channel monitor 100 attenuates the center odd channel 502 by 5 dB and each adjacent odd channel 508, 510 by 25 dB. When the tunable filter 102 of optical channel monitor 100 is tuned to center frequency 506, the contribution to the optical power of the second passband signal 122B from the center odd channel 502 will be about −25 dBm (e.g., −20 dBm actual power +−5 dB attenuation) and the contribution from each of adjacent odd channels 508, 510 will be about −35 dBm (e.g., −10 dBm actual power +−25 dB attenuation), for an aggregate total of −24.21 dBm measured optical power for the second passband signal 122B. As such, the contributions from the adjacent odd channels 508, 510 introduce a mere 0.79 dB error, notwithstanding the 10 dB power disparity between the center odd channel 502 and the adjacent odd channels 508, 510.

Accordingly, some embodiments disclosed herein include determining error-corrected optical power. In some examples, the error-corrected optical power for a given even or odd channel is determined according to the following formula:

$$P_{1\text{-}corrected} = P_{1\text{-}measured} - (P_{2\text{-}measured} \cdot A) - (P_{3\text{-}measured} \cdot A),$$

where $P_{1\text{-}corrected}$ is the error-corrected power of the given even or odd channel, $P_{1\text{-}measured}$ is the measured optical power of the second passband signal 122A or 122B when centered about a center frequency of the given even or odd channel, $P_{2\text{-}measured}$ is the measured optical power of the second passband signal 122A or 122B when centered about a center frequency of a first adjacent even or odd channel, $P_{3\text{-}measured}$ is the measured optical power of the second passband signal 122A or 122B when centered about a center frequency of a second adjacent even or odd channel, and A is the predetermined amount of attenuation by the optical channel monitor 100 of the adjacent even or odd channel(s) when the tunable filter 102 is tuned to the given even or odd channel. Further, in the formula provided above, all optical powers are provided in milliwatts ("mW") and the predetermined amount of attenuation is provided as a unit-less quantity.

By way of example, consider Table 1 including example optical power measurements of the second passband signal 122B when respectively tuned to odd channels 1, 3, 5, and 7.

TABLE 1

| Channel | Measured Power (mW) |
|---------|---------------------|
| 1 | 0.05 |
| 3 | 0.09 |
| 5 | 0.004 |
| 7 | 0.08 |

Taking the predetermined amount of attenuation $A_{min}$ as 0.003 (e.g., −25 dB), channel 3 as the given odd channel and channels 1 and 5 as the adjacent odd channels, the error-corrected power $P_{1\text{-}corrected}$ for channel 3 is calculated as follows:

$$P_{1\text{-}corrected} = 0.09 \text{ mW} - (0.05 \text{ mW} \cdot 0.003) - (0.004 \text{ mW} \cdot 0.003) = 0.0898 \text{ mW}.$$

As another example, and despite the obvious power disparity between channel 5 and adjacent channels 3 and 7, the error-corrected power $P_{1\text{-}corrected}$ for channel 5 is calculated by taking the predetermined amount of attenuation $A_{min}$ as 0.003, channel 5 as the given odd channel and channels 3 and 7 as the adjacent odd channels, and making the following calculation:

$$P_{1\text{-}corrected} = 0.004 \text{ mW} - (0.09 \text{ mW} \cdot 0.003) - (0.08 \text{ mW} \cdot 0.003) = 0.00349 \text{ mW}.$$

II. Example Method of Operation

The optical channel monitor 100 can be implemented in a variety of operating environments, such as in optical data and communication networks. For instance, the optical channel monitor 100 can be implemented at the output of a wavelength selective switch ("WSS") using a tap and/or at the output of an optical amplifier such as an erbium doped fiber amplifier ("EDFA").

Figure 6:
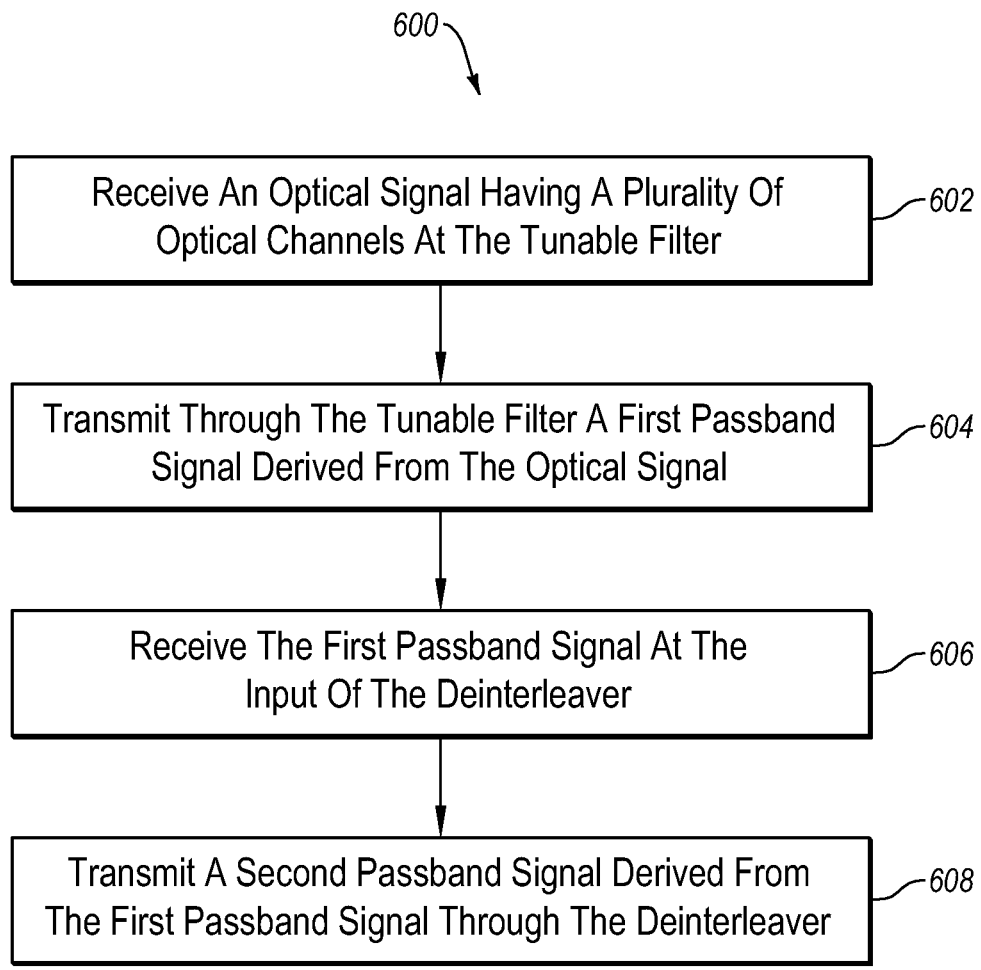
FIG. 6 is a flowchart of an example method for monitoring optical power using the optical channel monitor of FIG. 1.

Turning next to FIG. 6, an example method 600 of operating the optical channel monitor 100 is disclosed. Embodiments of the method 600 can be performed entirely by the optical channel monitor or in conjunction with a WSS or other components of an optical network.

The method 600 begins at 602 in some embodiments by receiving, at the tunable filter 102, the optical signal 118. The −20 dB bandwidth of the tunable filter 102 is between about two times and four times the input channel spacing $F_i$ of the deinterleaver 104 and the nominal channel spacing of the optical signal 118 is about equal to the input channel spacing $F_i$ of the deinterleaver in some embodiments.

At 604, first passband signal 120 derived from the optical signal 118 is transmitted through the tunable filter 102. The first passband signal 120 is centered about a particular even (or odd) center frequency corresponding to a particular even (or odd) channel. Further, the first passband signal 120 primarily includes contributions from the particular even (or odd) channel, one or more adjacent odd (or even) channels, and/or one or more adjacent even (or odd) channels in some embodiments. More generally, the first passband signal 120 primarily includes contributions from a particular channel, one or more first channels offset from the particular channel by a first frequency offset substantially equal to the input channel spacing $F_i$, and/or one or more second channels offset from the particular channel by a second frequency offset substantially equal to two times the input channel spacing $F_i$.

At 606, the deinterleaver 104 receives the first passband signal 120 at its input 104A.

At 608, the second passband signal 122A (or 122B) derived from the first passband signal 120 is transmitted through the deinterleaver 104. In the second passband signal 122A (or 122B), the attenuation of each of the one or more adjacent odd (or even) channels is at least a first predetermined amount of 40 dB or more and the attenuation of each of the one or more adjacent even (or odd) channels is at least a predetermined amount of 20 dB or more. More generally, for a second passband signal 122A or 122B centered on a particular channel, the attenuation of each of the first channels offset from the particular channel by the first frequency offset is at least a first predetermined amount and the attenuation of each of the second channels offset from the particular channel by the second frequency offset is at least a second predetermined amount.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, in some embodiments, the method 600 further includes measuring the optical power of the second passband signal 122A (or 122B) using the optical receiver 106 (or 108), amplifier 110 (or 112), ADC 114 and/or control module 116. Alternately or additionally, the measured optical power is stored in memory.

Optionally, the method 600 further includes scanning the tunable filter 102 across respective center frequencies of the optical channels of optical signal 118 and measuring the optical power of the second passband signal 122A, 122B when centered about each of the respective center frequencies. In some embodiments, scanning the tunable filter 102 and measuring the optical power includes the control module 116 repeatedly incrementing the center frequency to which the tunable filter 102 is tuned by an amount equal to the input channel spacing $F_i$ of the deinterleaver 104 and repeating steps 602-608 across all even and odd channels in the optical signal 118.

Alternately or additionally, the method 600 further includes determining respective error-corrected optical power for each optical channel according to the formula for $P_{1-corrected}$ provided above using the measured optical powers.

In some embodiments, the method 600 further includes determining that an error-corrected optical power of a particular optical channel is outside a target optical power range. In this and other examples, the control module 116 may make this determination by comparing the error-corrected optical powers to the target optical power range. Alternately or additionally, the control module 116 periodically reports the error-corrected optical powers to a remote computer which makes the determination.

In these and other embodiments, the method 600 may further include instructing an upstream WSS to adjust an attenuation of the particular optical channel having the error-corrected optical power outside the target optical power range. For example, if the error-corrected optical power for the particular optical channel is 0.004 mW, and the target optical power range is 0.1 mW±0.05 mW, the upstream WSS is instructed to decrease attenuation of the particular optical channel. As another example using the same target optical power range, if the error-corrected optical power for the particular optical channel is 0.2 mW, the upstream WSS is instructed to increase attenuation of the particular optical channel. In some embodiments, the instructions are provided to the upstream WSS from the control module 116 or from a remote computer.

III. Alternate Embodiments

Figure 7:
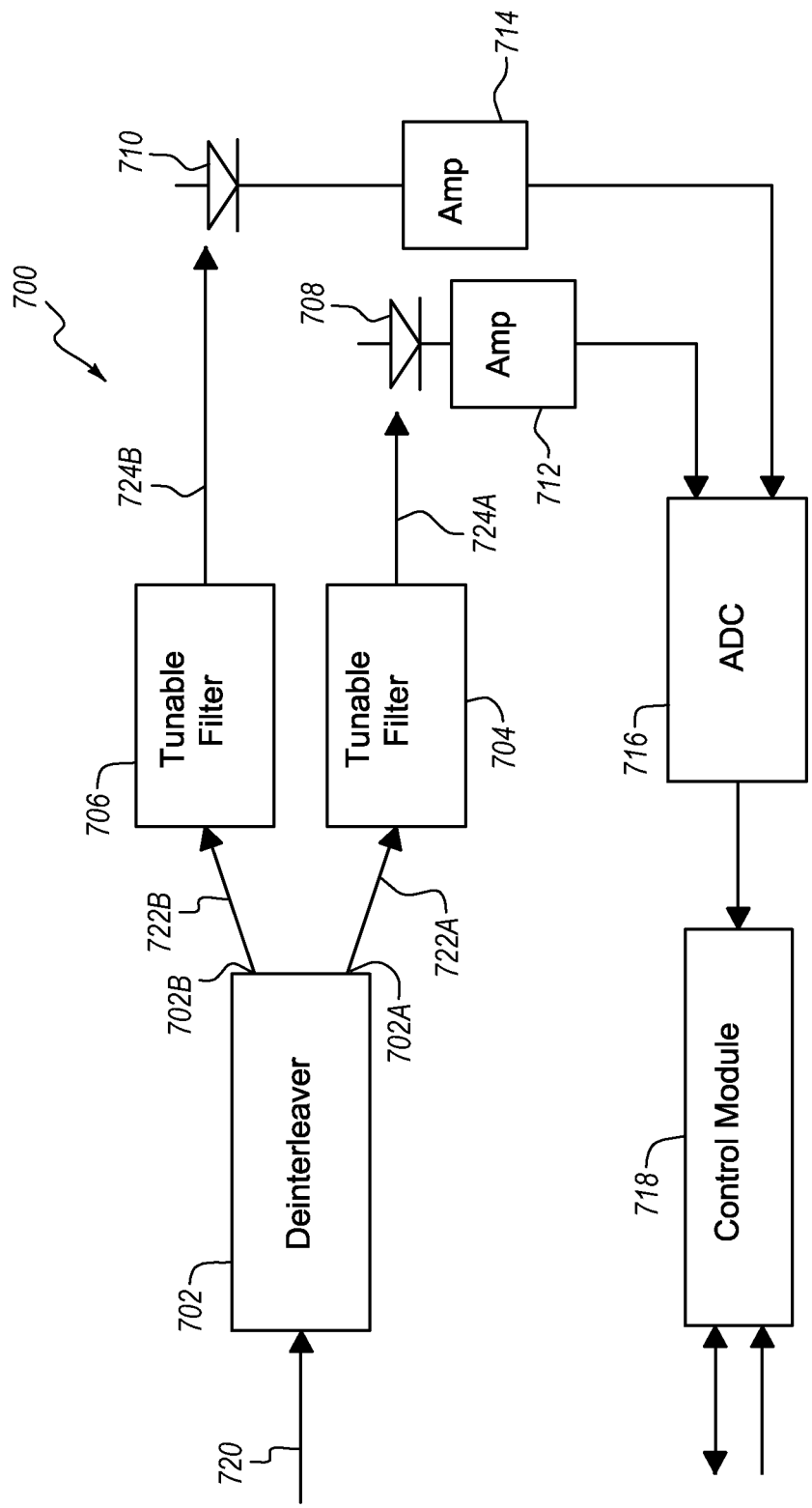
FIG. 7 is a block diagram of another example optical channel monitor including a deinterleaver and two tunable filters.

The optical channel monitor 100 of FIG. 1 is only one example of an optical channel monitor that can be implemented according to the embodiments described herein. For instance, FIG. 7 illustrates another example optical channel monitor 700 according to some embodiments. The optical channel monitor 700 includes a deinterleaver 702, two tunable filters 704, 706 connected, respectively, to even and odd outputs 702A, 702B of the deinterleaver 702, and first and second optical receivers 708, 710. Although not required in all embodiments, the optical channel monitor 700 further includes first and second post amplifiers 712, 714, an ADC 716, and a control module 718.

The deinterleaver 702 is generally similar to the deinterleaver 104 of FIG. 4. For example, the deinterleaver 702 is configured to separate an incoming optical signal 720 having multiple optical channels into one or more even channels and one or more odd channels. The input channel spacing $F_i$ of the deinterleaver 702 is about half of the output channel spacing $F_o$ on the even or odd outputs 702A, 702B. According to some embodiments, the nominal channel spacing of the optical signal 720 is between about one and two times the input channel spacing $F_i$ of the deinterleaver 702. The deinterleaver 702 is one example of a structural implementation of a means for separating an optical signal into one or more odd channels and one or more even channels.

The deinterleaver 702 emits an even first passband signal 722A at its even output 702A and an odd first passband signal 722B on its odd output 702B. Additionally, the filter response of the deinterleaver 702 is generally similar to the filter response 300 of the deinterleaver 104 of FIG. 1.

The tunable filter 704 is connected to the even output 702A and the tunable filter 706 is connected to the odd output 702B. Each of tunable filters 704, 706 is configured to receive a respective one of the even and odd first passband signals 722A, 722B and to transmit therethrough a corresponding even or odd second passband signal 724A, 724B. The tunable filters 704, 706 are generally similar to the tunable filter 102 of FIG. 1. As such, the −20 dB bandwidth (as defined with respect to FIG. 2) of each of tunable filters 704, 706 is between about two and four times the input channel spacing $F_i$ of the deinterleaver 702 in some embodiments. Additionally, the filter response of each of tunable filters 704, 706 is generally similar to the filter response 200 of the tunable filter 102 of FIG. 1.

The composite filter response of optical channel monitor 700 at the output of each of tunable filters 704, 706 is generally similar to the composite filter response 400 of FIG. 4.

The optical receivers 708, 710, post amplifiers 712, 714, ADC 716 and control module 718 are generally similar to the optical receivers 106, 108, post amplifiers 110, 112, ADC 114 and control module 116 of FIG. 1.

In operation, the optical channel monitor 700 is generally similar to the optical channel monitor 100 of FIG. 1, except that the optical signal 720 is received first at the deinterleaver 702 and split into even and odd components before being received at corresponding tunable filters 704, 706 connected to the even and odd outputs 702A, 702B of deinterleaver. As such, the optical channel monitor 700 in some embodiments can scan across every channel in the optical signal 720 twice as fast as the optical channel monitor 100 of FIG. 1.

As already indicated above, embodiments of the optical channel monitors 100, 700 do not all require post amplifiers 110, 112, 712, 714, ADC 114, 716 and/or control module 116, 718 for measuring the optical power of the second passband signals 122A, 122B, 724A, 724B. Instead, the optical channel monitors 100, 700 can include an oscilloscope, voltmeter, or other suitable means connected to outputs of optical receivers 106, 108, 708, 710 for measuring the optical power of second passband signals 122A, 122B, 724A, 724B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical channel monitor, comprising:
    a tunable filter configured to receive an optical signal having a plurality of channels spaced at a nominal channel spacing, the tunable filter having a −20 decibel bandwidth;
    a deinterleaver having an input with an input channel spacing $F_i$, an even output, and an odd output, the input being connected to an output of the tunable filter, wherein the nominal channel spacing is between about one and two times the input channel spacing $F_i$, and wherein the tunable filter −20 decibel bandwidth is between about two and four times the input channel spacing $F_i$;
    a first optical receiver coupled to the even output;
    a second optical receiver coupled to the odd output;
    a control module coupled to the tunable filter and configured to tune the tunable filter to a desired center frequency;
    a first post amplifier coupled to an output of the first optical receiver;
    a first analog-to-digital converter coupled to an output of the first post amplifier and coupled to the control module;
    a second post amplifier coupled to an output of the second optical receiver; and
    a second analog-to-digital converter coupled to an output of the second post amplifier and coupled to the control module.

2. The optical channel monitor of claim 1, wherein the nominal channel spacing is approximately 50 GHz, the tunable filter −20 decibel bandwidth is approximately 100 GHz, and the input channel spacing $F_i$ is approximately 50 GHz.

3. The optical channel monitor of claim 1, wherein the nominal channel spacing is approximately $F_i$ GHz, the tunable filter −20 decibel bandwidth is approximately $2 \cdot F_i$ GHz, and the input channel spacing is approximately $F_i$ GHz.

4. The optical channel monitor of claim 1 implemented in an optical network and coupled to a tap disposed at an output of a wavelength selective switch of the optical network.

5. The optical channel monitor of claim 1 implemented in an optical network and coupled to a tap disposed at an output of an optical amplifier of the optical network.

6. The optical channel monitor of claim 1, wherein the plurality of channels include a plurality of even channels and a plurality of odd channels, the deinterleaver being configured to substantially transmit the plurality of even channels through the even output and the plurality of odd channels through the odd output, further wherein:
    when the tunable filter is tuned to a particular one of the plurality of even channels, an aggregate attenuation by the tunable filter and the deinterleaver of each adjacent even channel is at least 20 decibels; or
    when the tunable filter is tuned to a particular one of the plurality of odd channels, an aggregate attenuation by the tunable filter and the deinterleaver of each adjacent odd channel is at least 20 decibels.

7. The optical channel monitor of claim 6, wherein:
    when the tunable filter is tuned to the particular one of the plurality of even channels, the aggregate attenuation by the tunable filter and the deinterleaver of each adjacent even channel is at least 25 decibels; or
    when the tunable filter is tuned to the particular one of the plurality of odd channels, the aggregate attenuation by the tunable filter and the deinterleaver of each adjacent odd channel is at least 25 decibels.

8. The optical channel monitor of claim 6, wherein:
    when the tunable filter is tuned to the particular one of the plurality of even channels, an aggregate attenuation by the tunable filter and the deinterleaver of each adjacent odd channel is at least 40 decibels; or
    when the tunable filter is tuned to the particular one of the plurality of odd channels, an aggregate attenuation by the tunable filter and the deinterleaver of each adjacent even channel is at least 40 decibels.

9. The optical channel monitor of claim 1, wherein each of the plurality of channels has a corresponding center frequency and wherein the control module is configured to:
    scan the tunable filter across respective center frequencies of the plurality of channels;
    measure an optical power of an optical signal output by the deinterleaver when the optical signal is centered about each of the respective center frequencies; and
    determine an error-corrected optical power for each of the plurality of channels.

10. The optical channel monitor of claim 9, wherein the control module is configured to determine an error-corrected optical power for each of the plurality of channels according to:

$$P_{1\text{-corrected}} = P_{1\text{-measured}} - (P_{2\text{-measured}} \cdot A) \cdot (P_{3\text{-measured}} \cdot A),$$

wherein:
    $P_{1\text{-corrected}}$ is the error-corrected optical power of a given channel from among the plurality of channels;
    $P_{1\text{-measured}}$ is a measured optical power of the optical signal output by the deinterleaver when the tunable filter is centered about the center frequency of the given optical channel;
    $P_{2\text{-measured}}$ is a measured optical power of the optical signal output by the deinterleaver when the tunable filter is centered about the center frequency of one of the plurality of channels offset from the given optical channel by an offset substantially equal to two times the input channel spacing $F_i$;
    $P_{3\text{-measured}}$ is a measured optical power of the optical signal output by the deinterleaver when the tunable filter is centered about the center frequency of another of the plurality of channels offset from the given optical channel by an offset substantially equal to two times the input channel spacing $F_i$; and
    A is a predetermined amount of attenuation.

11. An optical channel monitor, comprising:
    a tunable filter configured to receive an optical signal having a plurality of channels spaced at a nominal channel spacing, the tunable filter having a −20 decibel bandwidth;

a deinterleaver having an input with an input channel spacing $F_i$, an even output, and an odd output, the input being connected to an output of the tunable filter, wherein the nominal channel spacing is between about one and two times the input channel spacing $F_i$, and wherein the tunable filter −20 decibel bandwidth is between about two and four times the input channel spacing $F_i$;

a first optical receiver coupled to the even output;

a second optical receiver coupled to the odd output; and a control module coupled to the tunable filter and configured to tune the tunable filter to a desired center frequency;

wherein the plurality of channels include a plurality of even channels and a plurality of odd channels, the deinterleaver being configured to substantially transmit the plurality of even channels through the even output and the plurality of odd channels through the odd output, further wherein:

when the tunable filter is tuned to a particular one of the plurality of even channels, an aggregate attenuation by the tunable filter and the deinterleaver of each adjacent even channel is at least 20 decibels; or when the tunable filter is tuned to a particular one of the plurality of odd channels, an aggregate attenuation by the tunable filter and the deinterleaver of each adjacent odd channel is at least 20 decibels.

12. The optical channel monitor of claim 11, wherein the nominal channel spacing is approximately $F_i$ GHz, the tunable filter −20 decibel bandwidth is approximately $2 \cdot F_i$ GHz, and the input channel spacing is approximately $F_i$ GHz.

13. The optical channel monitor of claim 11, wherein:

when the tunable filter is tuned to the particular one of the plurality of even channels, an aggregate attenuation by the tunable filter and the deinterleaver of each adjacent odd channel is at least 40 decibels; or when the tunable filter is tuned to the particular one of the plurality of odd channels, an aggregate attenuation by the tunable filter and the deinterleaver of each adjacent even channel is at least 40 decibels.

14. The optical channel monitor of claim 11, wherein each of the plurality of channels has a corresponding center frequency and wherein the control module is configured to:

scan the tunable filter across respective center frequencies of the plurality of channels;

measure an optical power of an optical signal output by the deinterleaver when the optical signal is centered about each of the respective center frequencies; and determine an error-corrected optical power for each of the plurality of channels.

15. The optical channel monitor of claim 14, wherein the control module is configured to determine an error-corrected optical power for each of the plurality of channels according to:

$$P_{1\text{-corrected}} = P_{1\text{-measured}} - (P_{2\text{-measured}} \cdot A) - (P_{3\text{-measured}} \cdot A),$$

wherein:

$P_{1\text{-corrected}}$ is the error-corrected optical power of a given channel from among the plurality of channels;

$P_{1\text{-measured}}$ is a measured optical power of the optical signal output by the deinterleaver when the tunable filter is centered about the center frequency of the given optical channel;

$P_{2\text{-measured}}$ is a measured optical power of the optical signal output by the deinterleaver when the tunable filter is centered about the center frequency of one of the plurality of channels offset from the given optical channel by an offset substantially equal to two times the input channel spacing $F_i$;

$P_{3\text{-measured}}$ is a measured optical power of the optical signal output by the deinterleaver when the tunable filter is centered about the center frequency of another of the plurality of channels offset from the given optical channel by an offset substantially equal to two times the input channel spacing $F_i$; and A is a predetermined amount of attenuation.

16. An optical channel monitor, comprising:

a tunable filter configured to receive an optical signal having a plurality of channels spaced at a nominal channel spacing, the tunable filter having a −20 decibel bandwidth;

a deinterleaver having an input with an input channel spacing $F_i$, an even output, and an odd output, the input being connected to an output of the tunable filter, wherein the nominal channel spacing is between about one and two times the input channel spacing $F_i$, and wherein the tunable filter −20 decibel bandwidth is between about two and four times the input channel spacing $F_i$;

a first optical receiver coupled to the even output;

a second optical receiver coupled to the odd output; and a control module coupled to the tunable filter and configured to tune the tunable filter to a desired center frequency;

a first post amplifier coupled to an output of the first optical receiver;

a second post amplifier coupled to an output of the second optical receiver; and an analog-to-digital converter coupled to an output of the first post amplifier, coupled to an output of the second post amplifier, and coupled to the control module.

17. The optical channel monitor of claim 16, wherein the nominal channel spacing is approximately $F_i$ GHz, the tunable filter −20 decibel bandwidth is approximately $2 \cdot F_i$ GHz, and the input channel spacing is approximately $F_i$ GHz.

18. The optical channel monitor of claim 16, wherein the plurality of channels include a plurality of even channels and a plurality of odd channels, the deinterleaver being configured to substantially transmit the plurality of even channels through the even output and the plurality of odd channels through the odd output, further wherein:

when the tunable filter is tuned to a particular one of the plurality of even channels, an aggregate attenuation by the tunable filter and the deinterleaver of each adjacent even channel is at least 25 decibels and of each adjacent odd channel is at least 40 decibels; or when the tunable filter is tuned to a particular one of the plurality of odd channels, an aggregate attenuation by the tunable filter and the deinterleaver of each adjacent odd channel is at least 25 decibels and of each adjacent even channel is at least 40 decibels.

19. The optical channel monitor of claim 16, wherein each of the plurality of channels has a corresponding center frequency and wherein the control module is configured to:

scan the tunable filter across respective center frequencies of the plurality of channels;

measure an optical power of an optical signal output by the deinterleaver when the optical signal is centered about each of the respective center frequencies; and determine an error-corrected optical power for each of the plurality of channels.

20. The optical channel monitor of claim 19, wherein the control module is configured to determine an error-corrected optical power for each of the plurality of channels according to:

$$P_{1\text{-}corrected} = P_{1\text{-}measured} - (P_{2\text{-}measured} \cdot A) - (P_{3\text{-}measured} \cdot A),$$

wherein:
- $P_{1\text{-}corrected}$ is the error-corrected optical power of a given channel from among the plurality of channels;
- $P_{1\text{-}measured}$ is a measured optical power of the optical signal output by the deinterleaver when the tunable filter is centered about the center frequency of the given optical channel;
- $P_{2\text{-}measured}$ is a measured optical power of the optical signal output by the deinterleaver when the tunable filter is centered about the center frequency of one of the plurality of channels offset from the given optical channel by an offset substantially equal to two times the input channel spacing $F_i$;
- $P_{3\text{-}measured}$ is a measured optical power of the optical signal output by the deinterleaver when the tunable filter is centered about the center frequency of another of the plurality of channels offset from the given optical channel by an offset substantially equal to two times the input channel spacing $F_i$; and
- A is a predetermined amount of attenuation.

* * * * *